United States Patent [19]
Sekine

[11] Patent Number: 5,978,724
[45] Date of Patent: Nov. 2, 1999

[54] VEHICLE CONTROL SYSTEM

[75] Inventor: Hiroshi Sekine, Saitama, Japan

[73] Assignee: Honda Giken Kogyo Kabushiki Kaisha, Tokyo, Japan

[21] Appl. No.: 08/970,473

[22] Filed: Nov. 14, 1997

[30] Foreign Application Priority Data

Nov. 19, 1996 [JP] Japan ..................................... 8-308253

[51] Int. Cl.⁶ ...................................................... G06F 7/70
[52] U.S. Cl. ................................ 701/70; 701/1; 701/207; 701/208; 340/988; 340/990
[58] Field of Search ................................. 701/1, 70, 200, 701/207, 208, 210, 212, 214; 340/988, 990

[56] References Cited

U.S. PATENT DOCUMENTS

| | | | |
|---|---|---|---|
| 4,123,023 | 10/1978 | Nelson | 701/117 |
| 5,552,990 | 9/1996 | Ihara et al. | 701/200 |

FOREIGN PATENT DOCUMENTS 6281471  10/1994  Japan .

*Primary Examiner*—William A. Cuchlinski, Jr.
*Assistant Examiner*—Gertrude Arthur
*Attorney, Agent, or Firm*—Carrier, Blackman & Associates, P.C.; Joseph P. Carrier; William D. Blackman

[57] ABSTRACT

A vehicle control system enables the passableness of a vehicle through an upcoming section of road to be properly decided, by compensating the influences which are exerted upon the passableness decision by the detection errors of the actual position of the vehicle. Assuming that a deceleration is performed by the vehicle driver at a predetermined reference deceleration β from a vehicle speed $V_0$ at an actual position $P_0$, the system calculates passable vehicle speeds of a plurality of tentative positions $N_k$ which are set on a road ahead of the actual position $P_0$. On the basis of the passable vehicle speeds corresponding to the individual tentative positions $N_k$, a passable zone $Z_1$, a warning zone $Z_2$ and an automatic deceleration zone $Z_3$ are set by the system so that a warning to the driver is performed, if any of nodes $N_{k+1}$, - - -, and so on ahead of the tentative position $N_k$ is present in the warning zone $Z_2$, and the automatic deceleration of the vehicle is performed if any of the nodes are present in the automatic deceleration zone $Z_3$. In order that the decision error of the passableness, as accompanying the detection error of the actual position $P_0$, may be compensated, the reference deceleration β is corrected in accordance with the magnitude of the vehicle speed $V_0$ or the radius of curvature of the road.

18 Claims, 16 Drawing Sheets

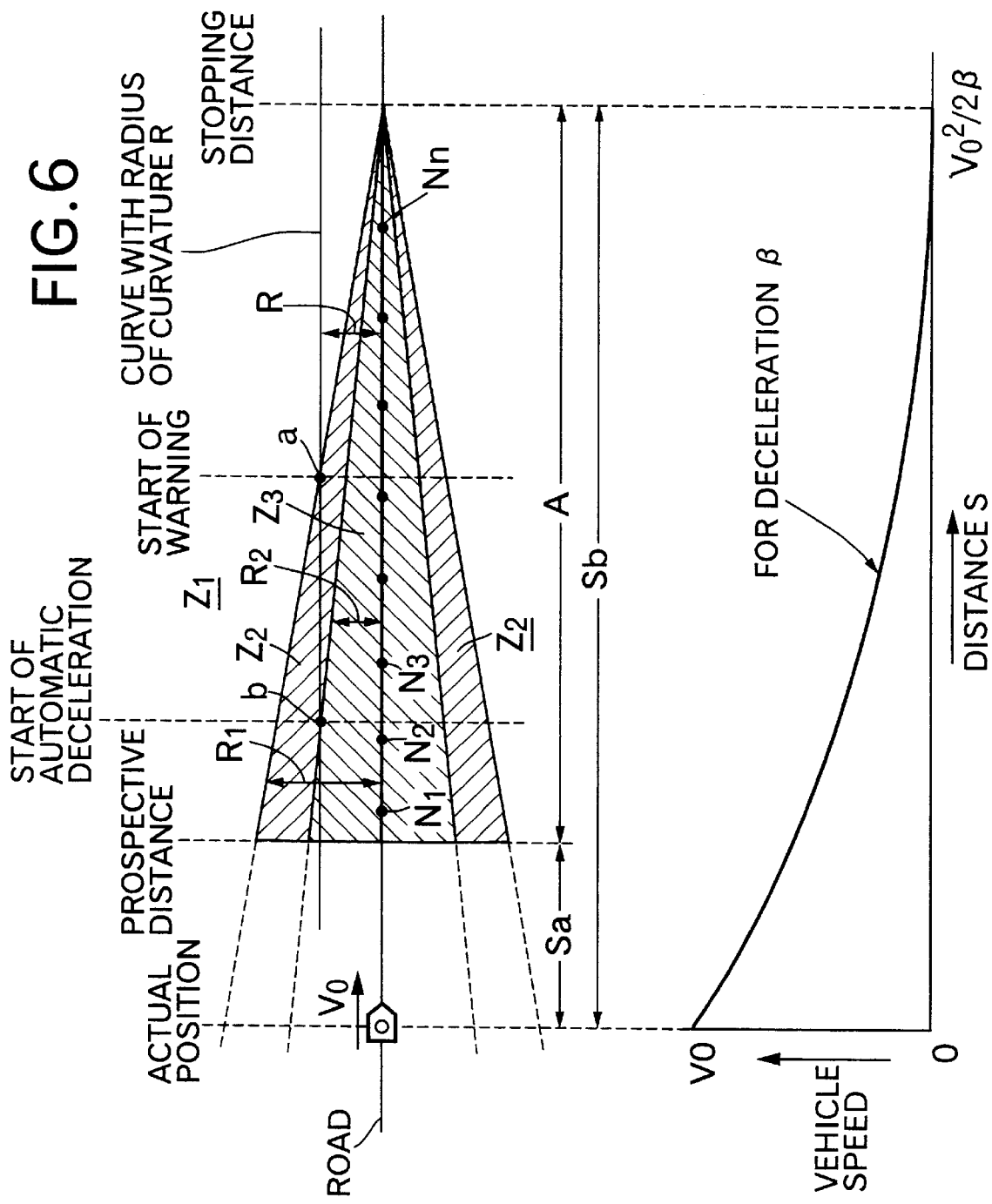

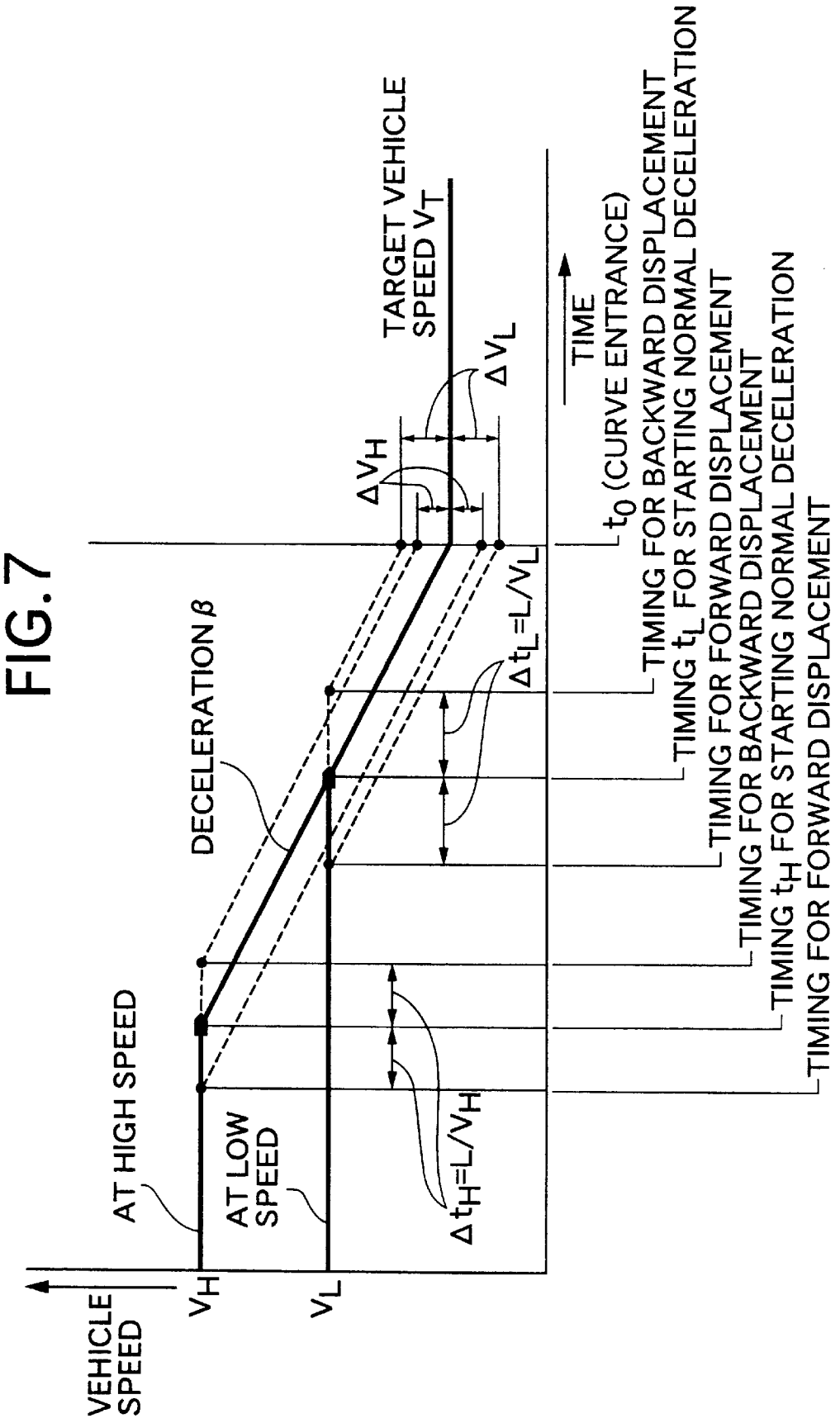

AT HIGH VEHICLE SPEED

AT LOW VEHICLE SPEED

VEHICLE CONTROL SYSTEM

BACKGROUND OF THE INVENTION

1. Technical Field to Which the Invention Belongs

The present invention relates to a vehicle control system for controlling a vehicle on the basis of a road shape ahead of the vehicle, as decided on the basis of map data comprised of a set of coordinate points.

2. Discussion of Relevant Art

According to a previous proposal (i.e., Japanese Patent Application Laid-Open No. 6-281471) of the Assignee, a passable zone is set on a map on the basis of map data obtained from a navigation system, so that when a curve in the road ahead of the subject vehicle of the driver goes out the passable zone, a warning is issued to urge the driver to decelerate the vehicle, or an automatic braking or the like is actuated to effect an automatic deceleration.

Although the previously proposed system is effective for its intended purpose, more or less errors are present in the map data obtained from the navigation system so that they unavoidably are reflected in the actual position of the vehicle determined on the basis of the map data. As a result, when the vehicle is to be decelerated at a predetermined rate from its actual position to a curve ahead, the estimated passage speed of the vehicle at the curve is dispersed from its optimum value by the errors of the actual position, thereby causing a reduction in the system's accuracy for deciding the passableness of the curve.

SUMMARY OF THE INVENTION

The present invention has been conceived in view of the background described above and has an object to enable the passableness of a vehicle through a curve ahead to be properly decided, by compensating the influences which are exerted upon the passableness decision by the detection errors of the actual position of the vehicle.

According to a first aspect and feature of a vehicle control system of the invention, a passableness deciding zone is set at a tentative position of a vehicle ahead of its actual position so that the passableness of the vehicle through an upcoming section of road is decided by comparing road data ahead of the tentative position and the passableness deciding zone. At this time, either a decision error, as caused by the detection error of the actual position, between high and low vehicle speeds or a decision error of the passableness between large and small curvatures of the road is reduced by correcting a reference deceleration for decelerating the vehicle from its actual position, and vehicle control is (in part) based thereon.

According to a second aspect and feature of the vehicle control system according to the invention, the radius of curvature of a road at a tentative position ahead of an actual position of a vehicle is calculated so that the passableness of the vehicle through an upcoming section of road is decided by comparing the turnable radius of the vehicle passing through the tentative position and the radius of curvature. At this time, either a decision error, as caused by the detection error of the actual position, between high and low vehicle speeds or a decision error of the passableness between large and small curvatures of the road is reduced by correcting a reference deceleration to decelerate the vehicle from its actual position, and vehicle control is (in part) based thereon.

According to a third aspect and feature of the vehicle control system according to the invention, the proper passage speed of the vehicle at a tentative position ahead of an actual position thereof is calculated so that the passableness of a vehicle is decided by comparing the estimated passage speed of the vehicle passing through the tentative position and the proper passage speed. At this time, either a decision error, as caused by the detection error of the actual position, between high and low vehicle speeds or a decision error of the passableness between large and small curvatures of the road is reduced by correcting a reference deceleration to decelerate the vehicle from its actual position, and the vehicle control is (in part) based thereon.

According to a fourth aspect and feature of the vehicle control system according to the invention, the proper passage deceleration of a vehicle for passing through a tentative position ahead of an actual position thereof is calculated so that the passableness of the vehicle is decided by comparing a reference deceleration set on the basis of a road surface state and the proper passage deceleration. At this time, either a decision error, as caused by the detection error of the actual position, between high and low vehicle speeds or a decision error of the passableness between large and small curvatures of the road is reduced by correcting the reference deceleration to decelerate the vehicle from its actual position, and the vehicle control is (in part) based thereon.

According to a fifth aspect and feature of the vehicle control system, the reference deceleration is corrected on the basis of the detected vehicle speed. As a result, even if the actual position is erroneously detected, the error of the decision on the passableness between the high and low speeds can be reduced.

According to a sixth aspect and feature of the vehicle control system of the invention, the reference deceleration is corrected on the basis of the road data of the road ahead of the tentative position. As a result, even if the actual position is erroneously detected, the error of the decision on the passableness between the large and small curvatures of the road can be reduced.

According to a seventh aspect and feature of the vehicle control system of the invention, the reference deceleration is corrected on the basis of the radius of curvature of the road, as calculated by the curvature radius calculating means. As a result, even if the actual position is erroneously detected, the error of the decision on the passableness can be reduced.

According to an eight aspect and feature of the vehicle control system of the invention, at least one of a warning to the driver and an automatic deceleration of the vehicle is performed by the vehicle control means. As a result, a proper countermeasure for safely passing the curve can be taken when the curve is difficult to pass.

BRIEF DESCRIPTION OF THE DRAWINGS

FIG. 6 is a diagram for explaining passableness deciding operations according to the preferred embodiment.

FIG. 7 is a diagram for explaining operations of the system when a reference deceleration is constant.

DETAILED DESCRIPTION OF THE PRESENTLY PREFERRED EMBODIMENTS

The present invention will be described in connection with its presently preferred embodiments with reference to the accompanying drawings.

FIGS. 1 to 10 showing the first preferred embodiment of the present invention are briefly described above.

Figure 1:
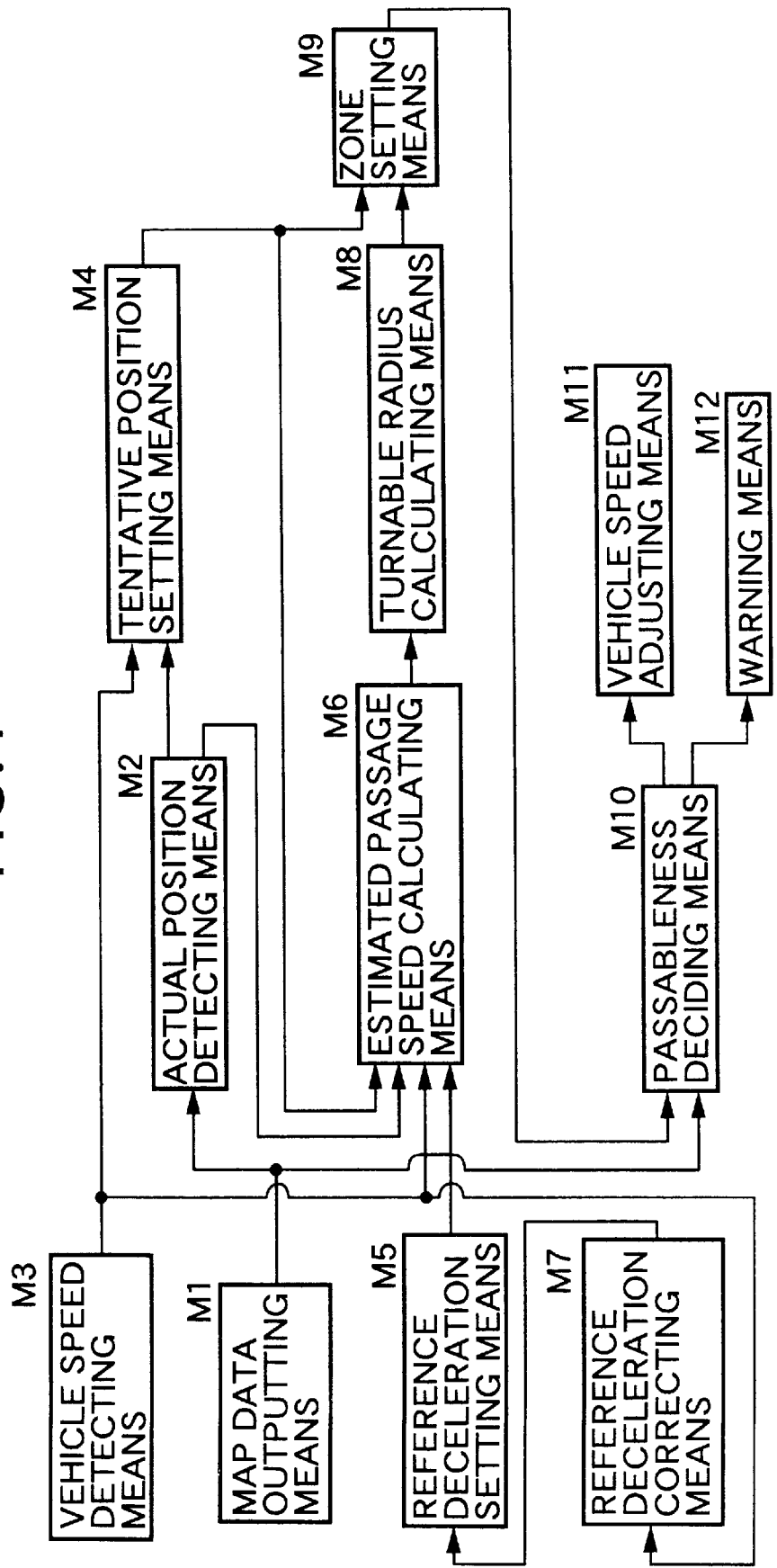
FIG. 1 is a block diagram showing the entire construction of a vehicle control system according to a first preferred embodiment of the present invention.

As shown in FIG. 1, the vehicle control system of the first embodiment is constructed to comprise map data outputting means M1, actual position detecting means M2, vehicle speed detecting means M3, tentative position setting means M4, reference deceleration setting means M5, estimated passage speed calculating means M6, reference deceleration correcting means M7, turnable radius calculating means M8, zone setting means M9, passableness deciding means M10, vehicle speed adjusting means M11, and warning means M12.

The map data outputting means M1 and the actual position detecting means M2 are mounted on a well-known navigation system. The map data outputting means M1 reads out and outputs the road data covering a predetermined range, as stored in advance in an IC card or CD-ROM. The actual position detecting means M2 detects the actual position $P_0$ on the map by overlapping the road data and the actual position data, as received from a GPS antenna, for example. The vehicle speed detecting means M3 detects the current vehicle speed $V_0$ of the vehicle on the basis of the outputs of wheel speed sensors fitted to the individual wheels.

The tentative position setting means M4 sets such a plurality of tentative positions $N_k$ ahead of the actual position $P_0$ as are used for deciding the passableness of the road. The reference deceleration setting means M5 sets a reference deceleration β, as established by a voluntary braking, if performed by the driver for passing the curve. The estimated passage speed calculating means M6 calculates an estimated passage speed $V_k$ of the vehicle speed at the individual tentative positions $N_k$ when the speed is decelerated at the reference deceleration β from the actual position $P_0$. The reference deceleration correcting means M7 preferably corrects the reference deceleration β on the basis of the vehicle speed $V_0$. The turnable radius calculating means M8 calculates the turnable radii $R_1$ and $R_2$ for allowing the vehicle to turn within reference transverse accelerations $\alpha_1$ and $\alpha_2$ when the vehicle turns at the individual tentative positions $N_k$ at the estimated passage speed $V_k$.

The zone setting means M9 sets a passable zone $Z_1$, a warning zone $Z_2$ and an automatic deceleration zone $Z_3$, as will be described, for the individual tentative positions $N_k$. The passableness deciding means M10 decides whether or not the road ahead can be safely passed through, by overlapping the individual zones $Z_1$, $Z_2$ and $Z_3$ at the individual tentative positions $N_k$ and the road ahead. The vehicle speed adjusting means M11 preferably includes engine output reducing means or braking means for decelerating the vehicle automatically when the road ahead of the tentative position $N_k$ belongs to the automatic deceleration zone $Z_3$. The warning means M12 preferably includes a buzzer, chime or lamp for issuing a warning to the driver when the road ahead of the tentative position $N_k$ belongs to the warning zone $Z_2$.

Figure 2:
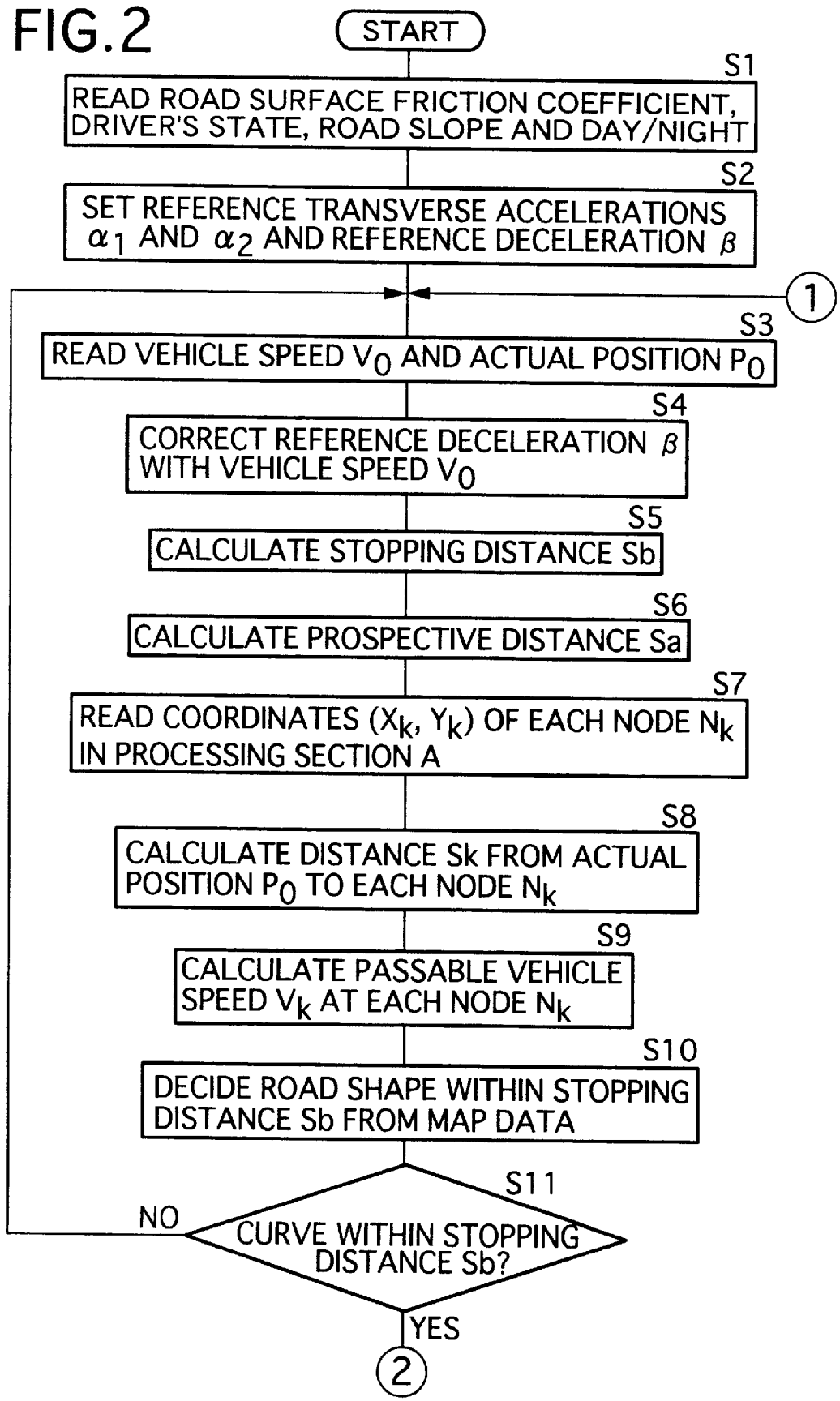
FIG. 2 is a first portion of the flow chart showing operations of the system of FIG. 1.
Figure 3:
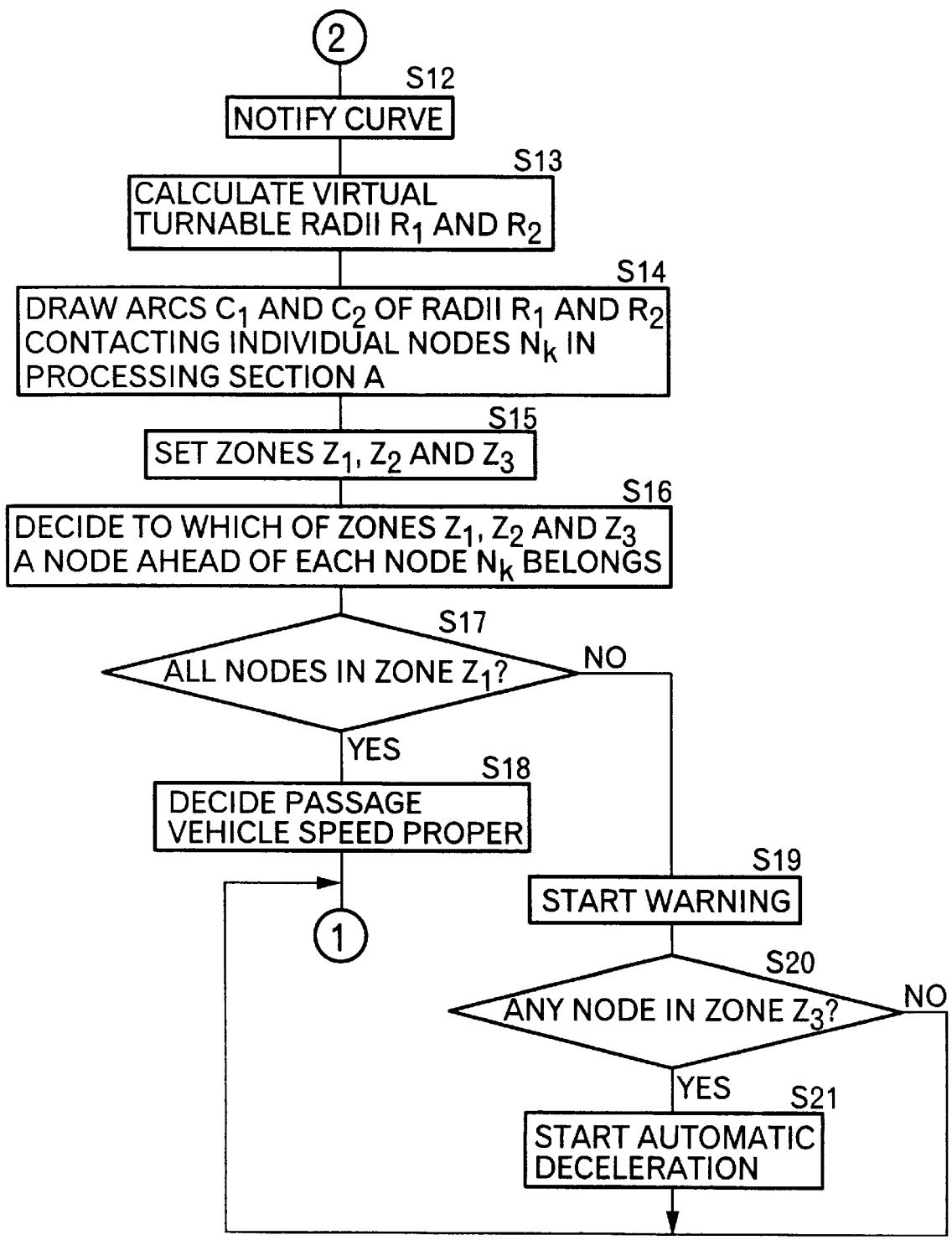
FIG. 3 is a second portion of the flow chart.

The operations of the first presently preferred embodiment thus constructed according to the invention will be described with additional reference to the flow charts of FIGS. 2 and 3.

First of all, the individual elements influencing the control, such as the friction coefficient of a road surface, the state (e.g., the driving skill or fatigue) of the driver, the slope of the road, or the day or night time are read (at step S1). Subsequently, predetermined reference transverse accelerations $\alpha_1$ and $\alpha_2$ and a reference deceleration β are set (at step S2) on the basis of those individual factors.

Here, the first reference transverse acceleration $\alpha_1$ is one for issuing the warning by the warning means M12 when it may be possibly exceeded by the vehicle passing a curve, and the second reference transverse acceleration $\alpha_2$ is one for effecting the automatic deceleration by the speed adjusting means when it may be possibly exceeded by the vehicle passing a curve. For example, the reference transverse accelerations are set such that $\alpha_1$=2 to 3 m/s$^2$ and $\alpha^2$=4 to 6 m/s$^2$ ($\alpha_2 > \alpha_1$). On the other hand, the reference deceleration β, as set by the reference deceleration setting means M5, is one at which the vehicle is assumed to perform a deceleration from its actual position $P_0$ by the voluntary braking of the driver.

These values $\alpha_1$, $\alpha_2$ and β will be different or altered depending on the road surface friction coefficient, the driver's state, the road slope or the day or night time read in at step S1. Under bad conditions such as a small road surface friction coefficient, a bad driver's state, a downslope and a nighttime giving a poor visibility, more specifically, the values $\alpha_1$, $\alpha_2$ and β are made smaller (to an allowable side) for an early warning or automatic deceleration.

Next, the vehicle speed $V_0$ is read in from the vehicle speed detecting means M3, and the coordinates $P_0$ ($X_0$, $Y_0$) of the actual position $P_0$ are read in from the actual position detecting means M2 (at step S3). On the basis of the vehicle speed $V_0$, moreover, the reference deceleration β, as set at step S2, is corrected (at step S4). This correction of the reference deceleration $\beta$ will be described in detail. Subsequently, a stopping distance Sb is calculated (at step S5). This stopping distance Sb corresponds to the distance which is required for the vehicle to stop when the vehicle is decelerated at the reference deceleration $\beta$ from the prevailing vehicle speed $V_0$. In other words, the stopping distance Sb is calculated, as follows:

$$Sb = V_0^2/2\beta \qquad (1).$$

Next, a prospective distance Sa is calculated (at step S6). This prospective distance Sa corresponds to the distance which is followed by the vehicle for a predetermined prospective time period t when the vehicle is decelerated at the reference deceleration $\beta$ for the prospective time period t from the current vehicle speed $V_0$. In other words, the prospective distance Sa is calculated, as follows:

$$Sa = V_0 t - (\beta t^2/2) \qquad (2).$$

Next, by the tentative position setting means M4, a processing section A, as defined by the prospective distance Sa and the stopping distance Sb, is calculated on the road ahead of the vehicle, and a plurality of coordinates $N_k(X_k, Y_k)$ of a plurality of nodes $N_k$(k=1, 2, 3, - - -, and n), as set on the road within the processing section A, are calculated from the road data of the map data outputting means M1 (at step S7). These nodes $N_k$ each sequentially constitute the tentative position $N_k$ of the vehicle according to the present invention.

Next, the distances $S_k$ between the actual position $P_0$ ($X_0$, $X_0$) and the individual nodes $N_k(X_k, Y_k)$ are individually calculated (at step S8) by the estimated passage speed calculating means M6. When a deceleration is performed at the reference deceleration $\beta$ from the current vehicle speed $V_0$ at the actual position $P_0$ ($X_0,X_0$) until reaching the individual nodes $N_k(X_k, Y_k)$, estimated passage speeds $V_k$(k=1, 2, 3, - - -, and n) at the individual nodes $N_k(X_k, Y_k)$ are individually calculated (at step S9). Since the distances $S_k$(k=1, 2, 3, - - -, and n) are given, as follows:

$$S_k = (V_0^2 - V_k^2)/2\beta \qquad (3),$$

the estimated passage speeds $V_k$ are calculated, as follows:

$$V_k = (V_0^2 - 2\beta S_k)^{1/2} \qquad (4).$$

Next, the road shape in the stopping distance Sb is decided (at step S10) on the basis of the road data coming from the map data outputting means M1. When a curve is present in the stopping distance Sb (at step S11), the driver is notified of the curve by an indication of a lamp or the like (at step S12).

Next, by the turnable radius calculating means M8, a node $N_1$, as located closest to the driver in the processing section A, is selected as the tentative position $N_1$, and a first turnable radius $R_1$ and a second turnable radius $R_2$ at the tentative position $N_1$ and at all subsequent nodes $N_2$ - - - and so on existing in the processing section A ahead of the former Node $N_1$ are calculated (at step S13) on the basis of the estimated passage speed $V_k$ at those nodes $N_k$ and the first and second reference transverse accelerations $\alpha_1$ and $\alpha_2$, as following:

$$R_1 = V_k^2/\alpha_1 \qquad (5);$$

and $$R_2 = V_k^2/\alpha_2 \qquad (6).$$

The first turnable radius $R_1$ corresponds to one which can be passed at the first reference acceleration $\alpha_1$ when entering the curve at the estimated passage speed $V_k$, and the second turnable radius $R_2$ corresponds to one which can be passed at the second reference acceleration $\alpha_2$ when entering the curve at the estimated passage speed $V_k$.

Figure 4:
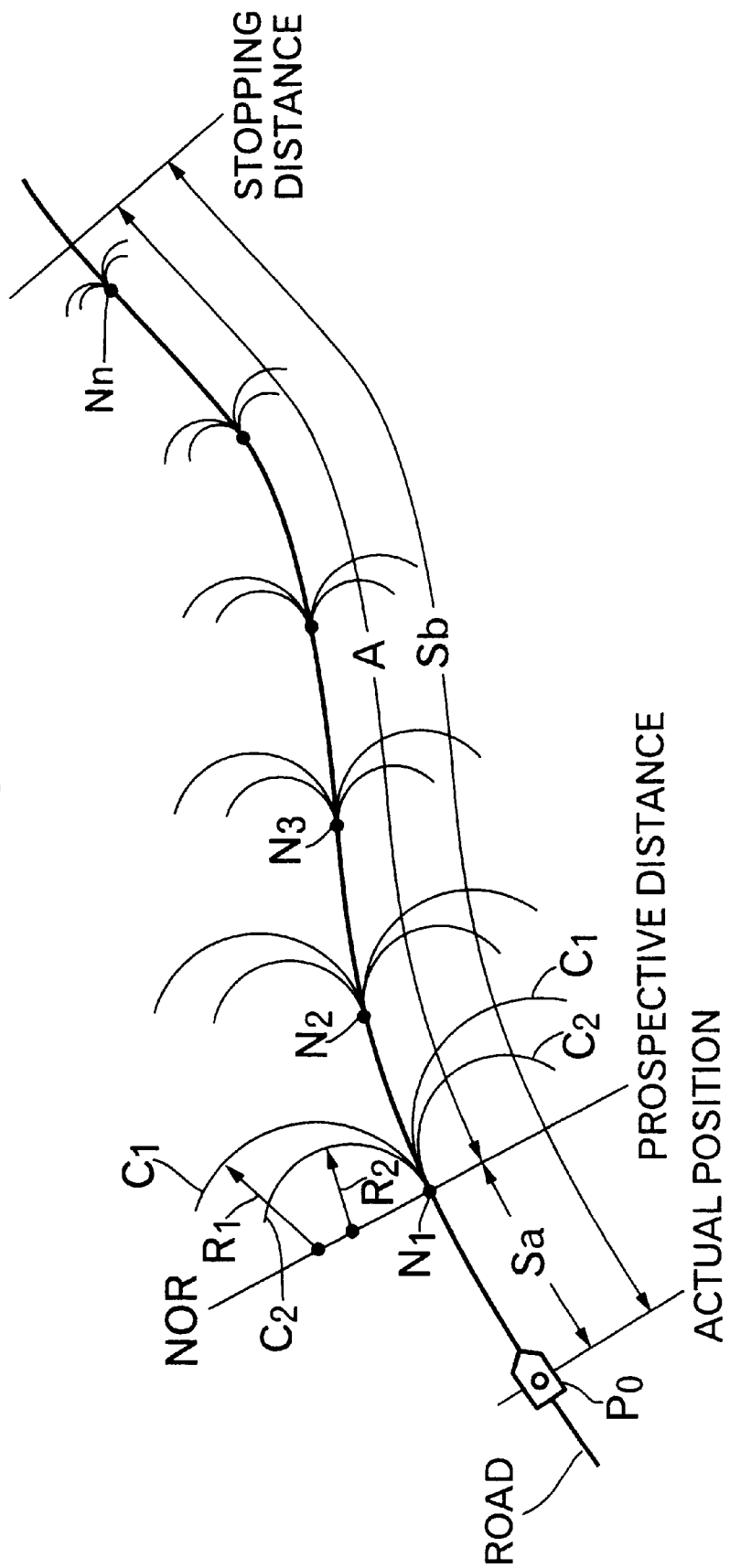
FIG. 4 is a diagram illustrating the state of setting individual zones on a road according to the preferred embodiment.

Next, normals NOR of the road are drawn at the individual nodes $N_k$, and a pair of right and left arcs $C_1$ and $C_1$ having the first turnable radius $R_1$, as calculated at step S13, and a pair of right and left arcs $C_2$ and $C_2$ having the second turnable radius $R_2$ are drawn with the centers located on the normals NOR and in contact with each node $N_k$ (at step S14). As a result, the four arcs $C_1$ and $C_1$; and $C_2$ and $C_2$ are drawn to correspond to each node $N_k$, as illustrated in FIG. 4. The radii (i.e., the first turnable radius $R_1$ and the second turnable radius $R_2$) of those four arcs $C_1$ and $C_1$; and $C_2$ and $C_2$ become smaller in the forward direction as they become further from the actual position $P_0$.

Figure 5:
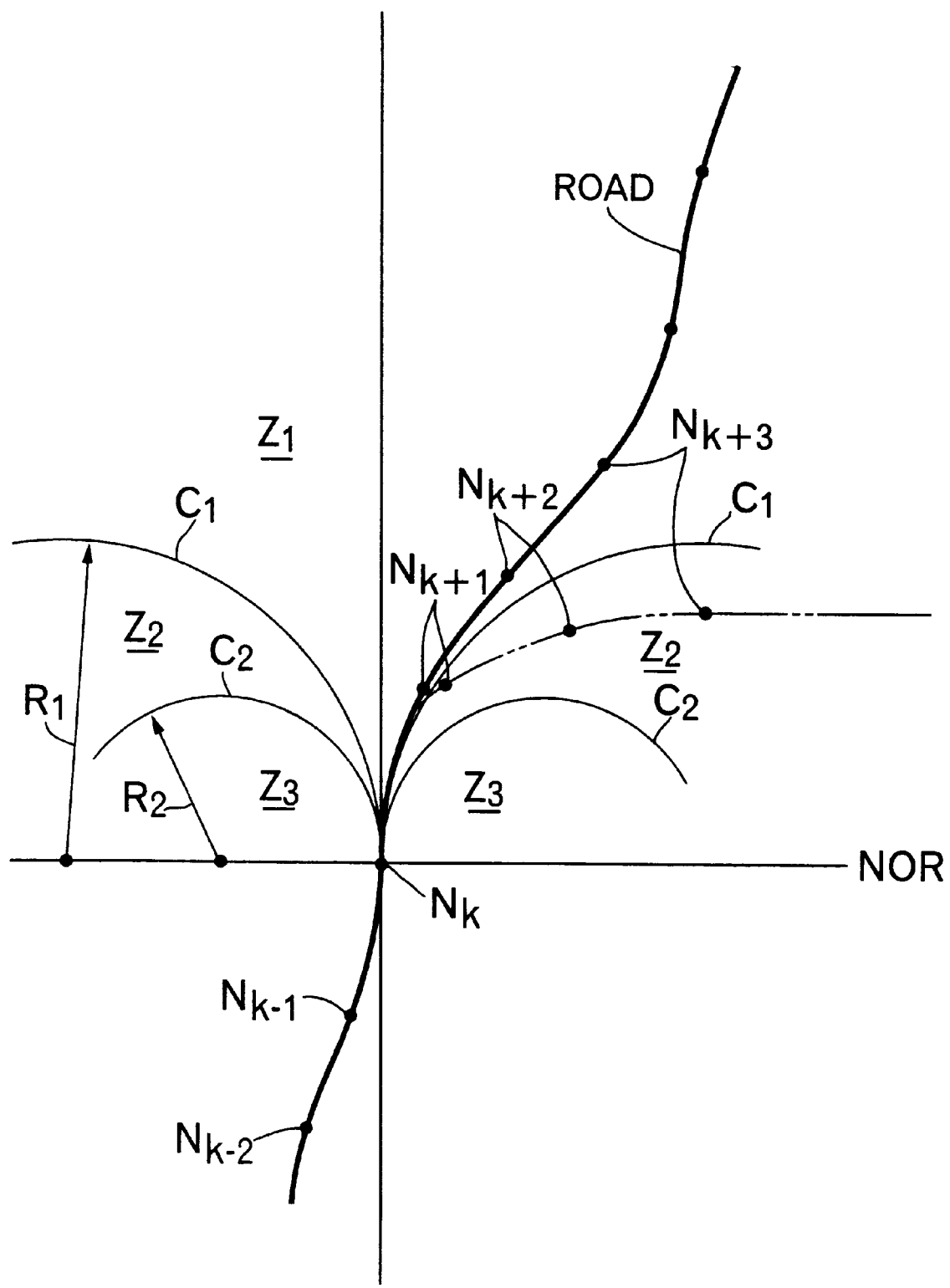
FIG. 5 is a diagram illustrating relations between the individual zones at a tentative position $N_1$ and the road according to the preferred embodiment.
Figure 8A:
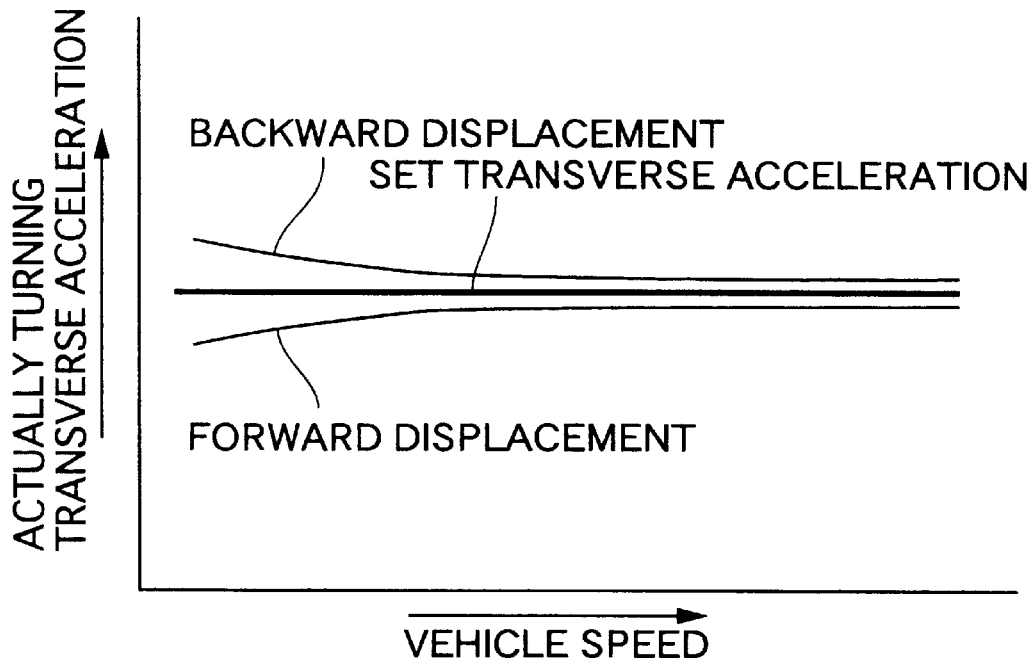
FIGS. 8A and 8B are diagrams illustrating changes in actually turning transverse decelerations depending upon the magnitude of the vehicle speed.
Figure 8B:
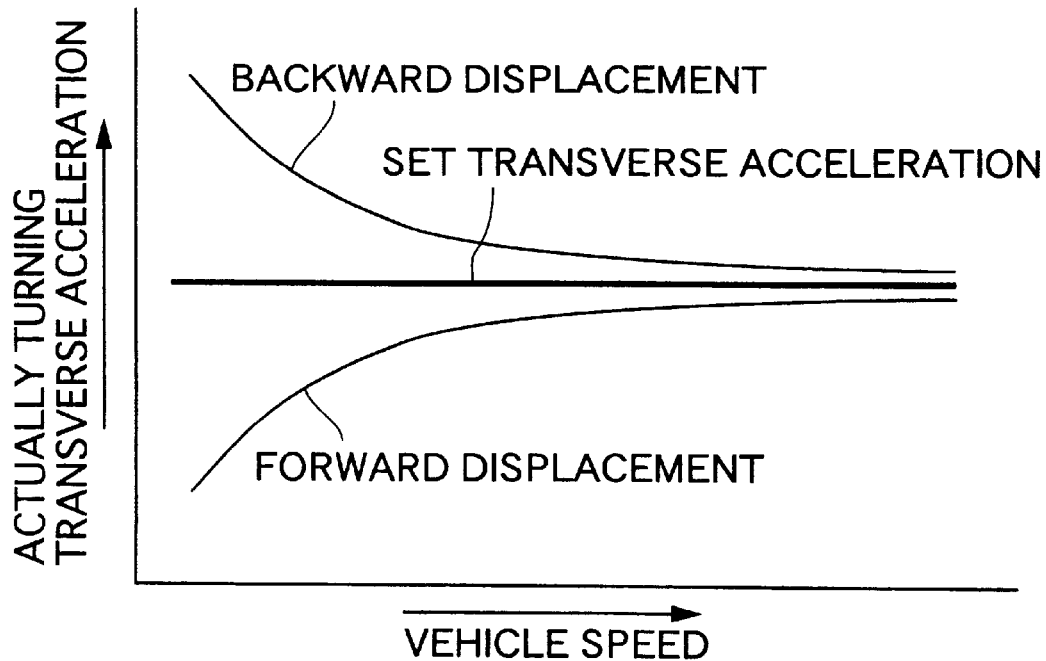

Next, by the zone setting means M9, the passable zone $Z_1$, the warning zone $Z_2$ and the automatic deceleration zone $Z_3$ are set (at step S15), which are defined by the four arcs $C_1$ and $C_1$; and $C_2$ and $C_2$ and the normals NOR. FIG. 5 illustrates the aforementioned individual zones $Z_1$, $Z_2$ and $Z_3$ at the node $N_1$, of which: the passable zone $Z_1$ is set ahead of the paired arcs $C_1$ and $C_1$; the warning zone $Z_2$ is set between the paired arcs $C_1$ and $C_1$ and the paired arcs $C_2$ and $C_2$; and the automatic deceleration zone $Z_3$ is set between the paired arcs $C_2$ and $C_2$ and the normal NOR.

Next, by passableness deciding means M10, the node $N_1$ the closest to the driver in the processing section A is set as the tentative position, and it is decided to which of the zones $Z_1$ to $Z_3$ a predetermined number of nodes $N_2$, $N_3$, $N_4$, $N_5$ - - -, and so on ahead belong. FIG. 5 illustrates the case in which the node $N_1$ is set as the tentative position. This operation is executed (at step S16) for all the tentative positions $N_1$ to $N_n$ by moving the tentative position sequentially from the closest node $N_1$ to the remotest node $N_n$ in the processing section A.

Thus, when the answer of step S17 is YES so that all the nodes $N_{k+1}$, $N_{k+2}$ - - -, and so on ahead fall within the passable zone $Z_1$, it is decided (at step S18) that the curve, as decided at step S10, can be safely passed at a proper vehicle speed, and the routine is returned to step S3.

On the other hand, when the answer of step S17 is NO so that any of the nodes $N_{k+1}$, $N_{k+2}$, - - -, and so on ahead falls within the warning zone $Z_2$ or the automatic deceleration zone $Z_3$, the warning means M12 is actuated to issue a warning to the driver (at step S19).

For any tentative position $N_k$, moreover, it is decided (at step S20) whether or not any of the nodes $N_{k+1}$, $N_{k+2}$, - - -, and so on ahead falls within the automatic deceleration zone $Z_3$. When this answer is NO so that the nodes $N_{k+1}$, $N_{k+2}$, - - -, and so on do not fall within the automatic deceleration zone $Z_3$, the routine is returned to step S3. When the answer of step S20 is YES so that any of the nodes $N_{k+1}$, $N_{k+2}$, - - -, and so on falls within the automatic deceleration zone $Z_3$, the vehicle speed adjusting means M10 is actuated to effect the automatic deceleration (at step S21).

These operations will be further described with reference to FIG. 6.

The second turnable radius $R_2$, as calculated by Formula (6), takes the maximum at the entrance of the processing section A and 0 at the exit of the processing section A where the vehicle V stops. Therefore, the automatic deceleration zone $Z_3$ takes a converging triangular shape. The first turnable radius $R_1$, as calculated by Formula (5), also takes the maximum at the entrance of the processing section A and 0 at the exit of the processing section A where the vehicle V stops. At the same time, $R_1 > R_2$, therefore, the warning zone $Z_2$ takes a pair of converging triangular shapes extending along the two sides of the automatic deceleration zone $Z_3$. Outside of the warning zone $Z_2$ and the automatic deceleration zone $Z_3$, there is the passable zone $Z_1$.

If it is assumed in FIG. 6 that a curve having a radius of curvature R exists on the road in the processing section A, a point a, at which the straight line indicating the curve having the curvature radius R intersects the outer edge of the warning zone $Z_2$, corresponds to a warning starting position so that the warning is issued by the warning means M12 when the curve approaches the warning starting position. On the other hand, a point b, at which the aforementioned straight line intersects the outer edge of the automatic deceleration zone $Z_3$, corresponds to an automatic deceleration starting position so that the automatic deceleration is started when the curve approaches the automatic deceleration starting position. Thus, when the curvature radius R of the curve is larger than the maximum first turnable radius $R_1$ at the entrance of the processing section A, the straight line indicating the curve having the curvature radius R will not intersect the warning zone $Z_2$ nor the automatic deceleration zone $Z_3$ so that neither the warning nor the automatic deceleration is executed.

As described above, the estimated passage speed $V_k$ is calculated by predicting that the driver performs a voluntary braking at the entry side of the curve based on visual observation or experience and by assuming that the vehicle is decelerated at the preset reference deceleration β by the voluntary braking. As a result, the estimated passage speed $V_k$ at each node $N_k$ becomes lower for each larger distance from the actual position $P_0$. Therefore, the aforementioned individual zones $Z_1$, $Z_2$ and $Z_3$, as set on the basis of the estimated passage speed $V_k$, are also those considering the voluntary braking of the driver, so that the warning by the warning means M12 or the automatic deceleration by the vehicle speed adjusting means M11 can be avoided from being frequently effected more than necessary, thereby to minimize the warning and the automatic deceleration.

Here will be described the correction of the reference deceleration β, as executed at step S4.

As illustrated in FIG. 7, it is assumed that a deceleration is started at the reference deceleration β at an instant $t_H$ so as to pass a curve ahead while the vehicle is running at a high speed $V_0 = V_H$, and that the vehicle speed reaches a target vehicle speed $V_T$ at an instant $t_0$ when the vehicle enters the curve. When it is considered that the detected actual position $P_0$ is displaced backward by a length L in the forward direction from the actual position $P_0$, the deceleration starting instant for passing the curve ahead is delayed by an error time period $\Delta t_H$ ($\Delta t_H = L/V_H$). When it is considered that the detected actual position $P_0$ is displaced forward by a length L in the forward direction from the actual position $P_0$, the deceleration starting instant for passing the curve ahead is advanced by an error time period $\Delta t_H$ ($\Delta t_H = L/V_H$). As a result, the vehicle speed at the entrance of the curve has an error of $\pm \Delta V_H$ with respect to the target vehicle speed $V_T$.

$$\Delta V_H = \Delta t_H \times \beta = L \times \beta / V_H \qquad (7).$$

On the other hand, it is assumed that a deceleration is started at the reference deceleration β at an instant $t_L$ so as to pass a curve ahead while the vehicle is running at a low speed $V_0 = V_L$ ($V_L < V_H$), and that the vehicle speed reaches a target vehicle speed $V_T$ at an instant to when the vehicle enters the curve. When it is considered that the detected actual position $P_0$ is displaced backward by a length L in the forward direction from the actual position $P_0$, the deceleration starting instant for passing the curve ahead is delayed by an error time period $\Delta t_L$ ($\Delta t_L = L/V_L$). When it is considered that the detected actual position $P_0$ is displaced forward by a length L in the forward direction from the actual position $P_0$, the deceleration starting instant for passing the curve ahead is advanced by an error time period $\Delta t_L$ ($\Delta t_L = L/V_L$). As a result, the vehicle speed at the entrance of the curve has an error of $\pm \Delta V_L$ with respect to the target vehicle speed $V_T$.

$$\Delta V_L = \Delta t_L \times \beta = L \times \beta / V_L \qquad (8).$$

Here are considered speed errors $\Delta V_H$ and $\Delta V_L$, as established on the basis of the detection error L of the actual position $P_0$, at the entrance of the curve. In Formulas (7) and (8), $V_H > V_L$ so that $\Delta V_H < \Delta V_L$. Specifically, even if the detection error L and the reference deceleration β of the actual position $P_0$ are constant, the speed error at the entrance of the curve becomes larger for lower vehicle speed at the actual position $P_0$. As a result, the actually turning transverse acceleration, as should be constant irrespective of the vehicle speed $V_0$ ($V_H$ or $V_L$) at the actual position $P_0$, is not made constant in the presence of the speed error $\Delta V_H$ or $\Delta V_L$, as apparent from FIGS. 8A and 8B, so that it is dispersed more largely for lower vehicle speed $V_0$ at the actual position $P_0$.

Figure 9:
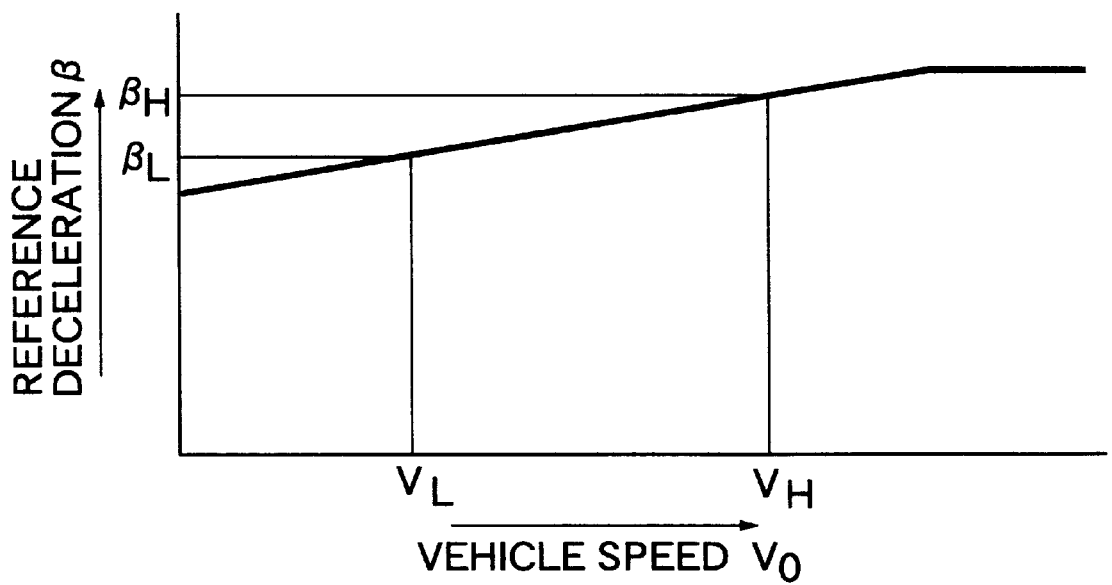
FIG. 9 is a diagram illustrating a relation between the vehicle speed and the reference deceleration according to the preferred embodiment.

In the present embodiment, therefore, the magnitude of the reference deceleration β for passing the curve is corrected on the basis of the magnitude of the vehicle speed $V_0$ at the actual position $P_0$, as illustrated in FIG. 9. Specifically, the reference deceleration β is set to increase as the vehicle speed $V_0$ at the actual position $P_0$ increases. At this time, the reference deceleration β is restricted by the upper limit so that it is kept at the upper limit even if the vehicle speed $V_0$ increases to the higher value.

Figure 10:
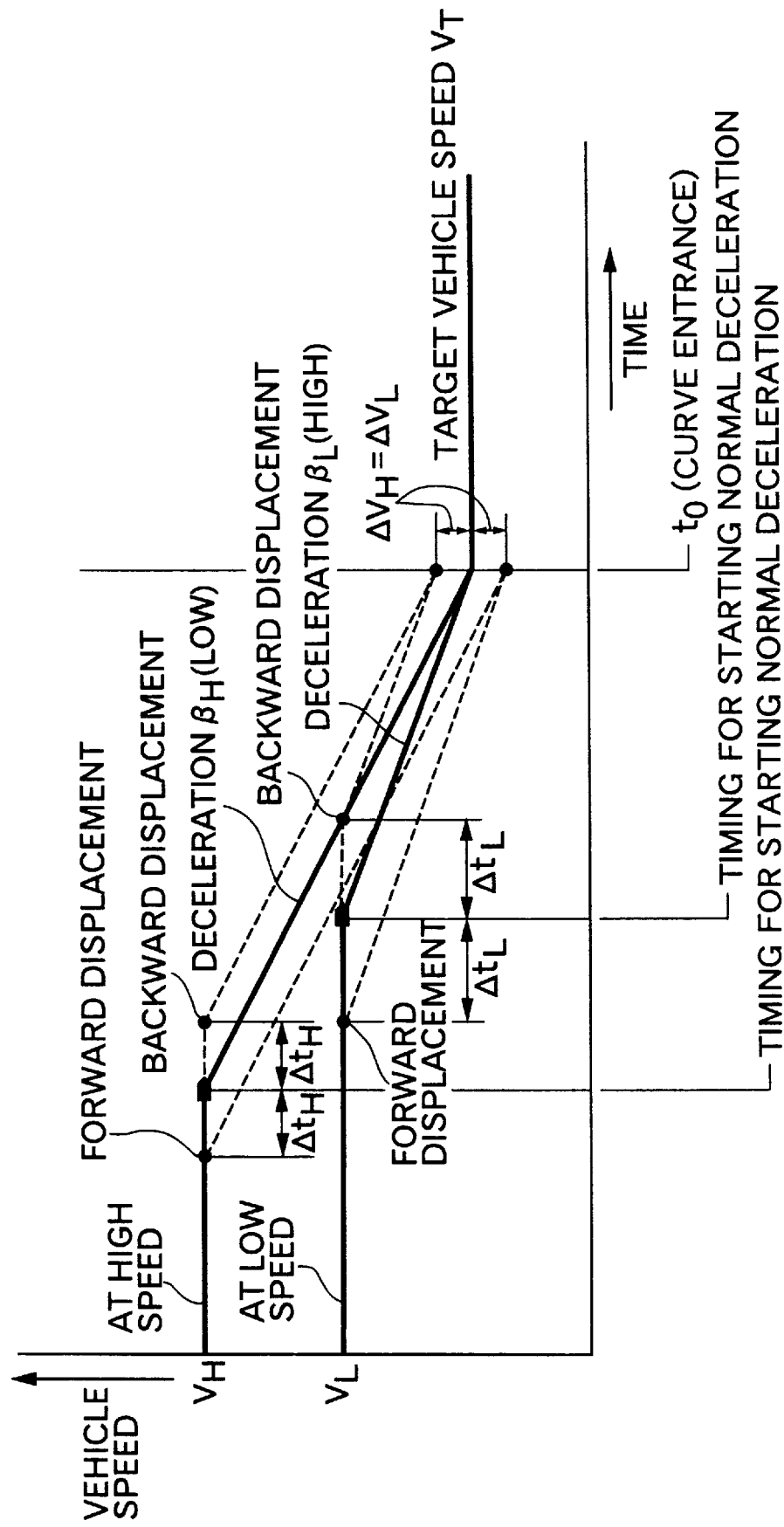
FIG. 10 is a diagram for explaining operations of the system when the reference deceleration is changed according to the preferred embodiment.

Thus, as shown in FIG. 10, the deceleration is executed at a high reference deceleration $\beta_H$ at a high vehicle speed time when the error time period $\Delta t_H$ of the deceleration starting instant is short. At a low vehicle speed time when the error time period $\Delta t_H$ of the deceleration starting instant is long, the deceleration is executed at a low reference deceleration $\beta_L$. As a result, the errors $\pm \Delta V_L$ of the vehicle speed at the entrance of the curve when the vehicle speed $V_0$ at the actual position $P_0$ is low ($V_0 = V_L$) is reduced to as small as the errors $\pm \Delta V_H$ of the vehicle speed at the entrance of the curve when the vehicle speed $V_0$ at the actual position $P_0$ is high ($V_0 = V_H$), so that the passableness of the curve can be decided with a stable accuracy irrespective of the magnitude of the vehicle speed $V_0$.

A second preferred embodiment of the present invention will be described with reference to FIGS. 11 to 13.

In the foregoing first preferred embodiment, the reference deceleration correcting means M7 corrects the reference deceleration β on the basis of the vehicle speed $V_0$. The second embodiment is different from the first embodiment in that the reference deceleration correcting means M7 corrects the reference deceleration β on the basis of the radius of curvature R of a curve. This curvature radius R of the curve can be calculated on the basis of the map data.

Figure 11:
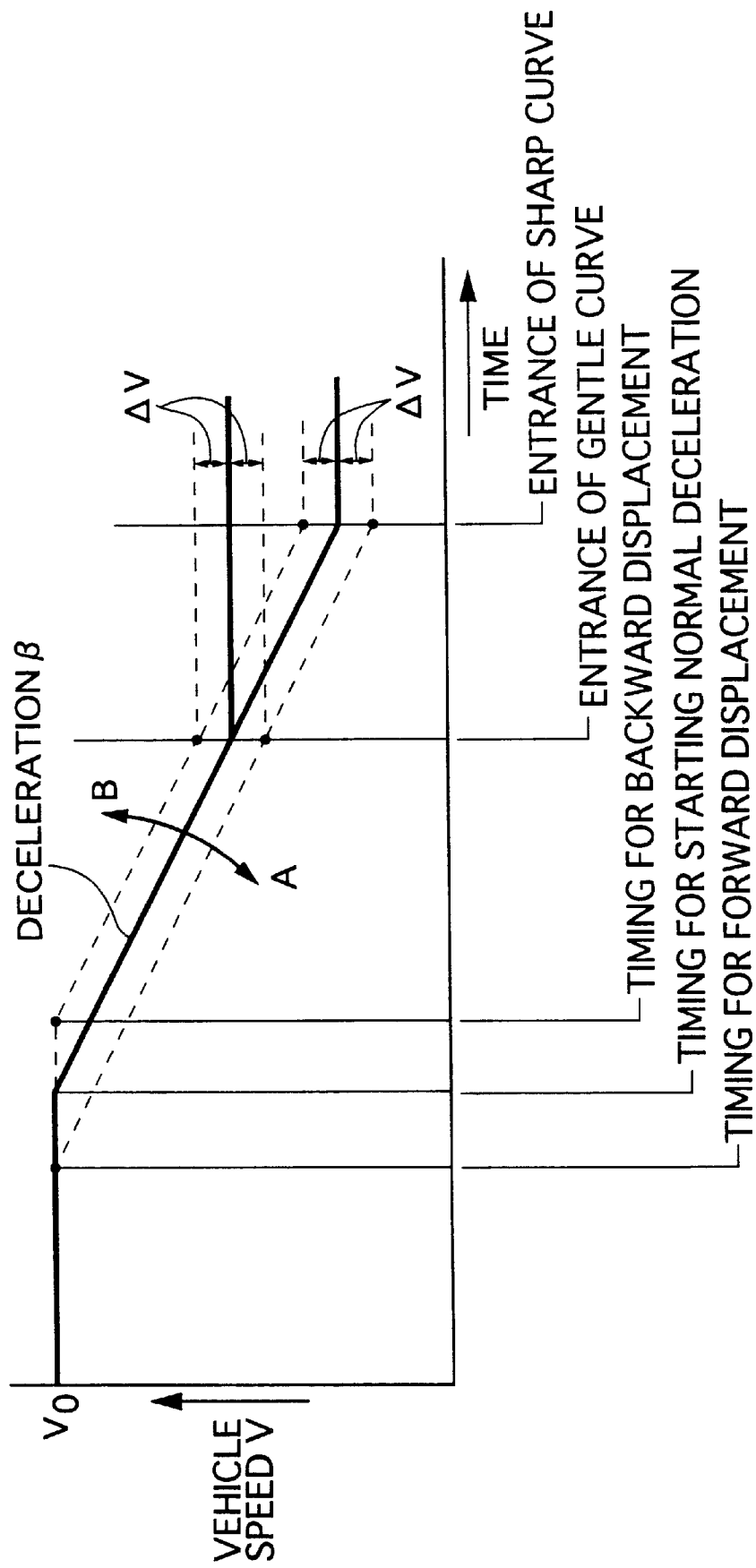
FIG. 11 is a diagram showing a second presently preferred embodiment of the invention and corresponds to FIG. 7 of the first embodiment.
Figure 12:
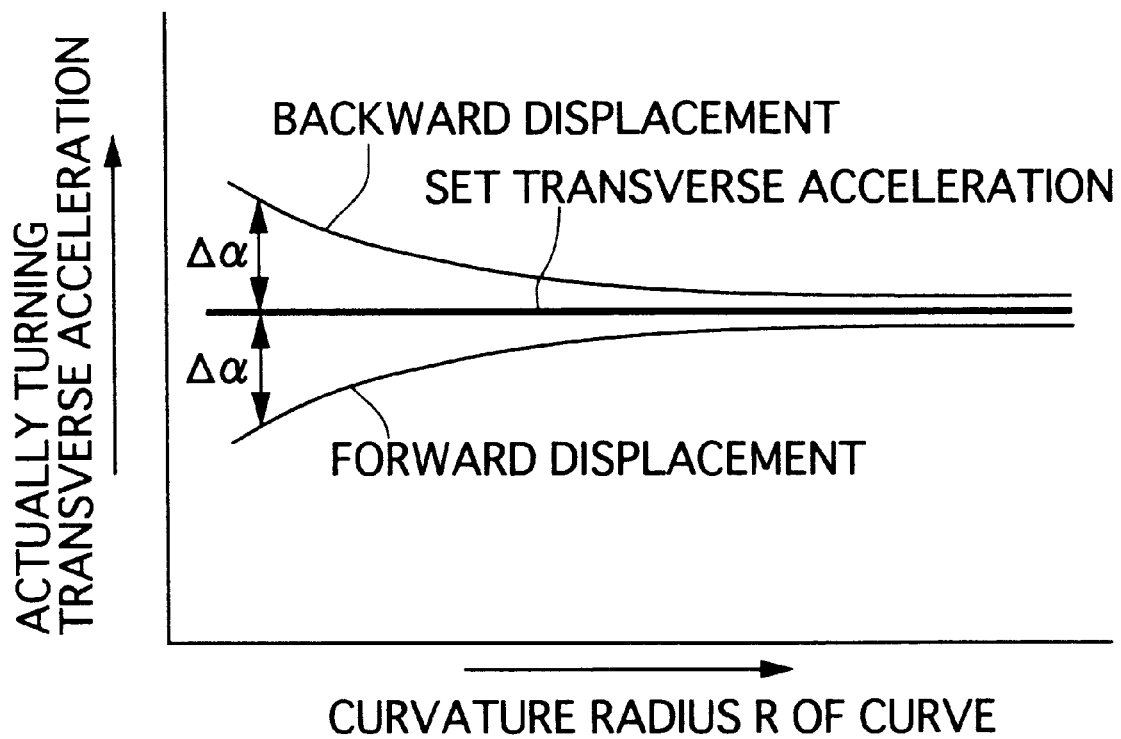
FIG. 12 is a diagram illustrating a change in an actually turning transverse acceleration according to the magnitude of the radius of curvature of a curve.

When the vehicle running at the vehicle speed $V_0$ is decelerated at the reference deceleration β to pass a gentle curve (having a large curvature radius) ahead or a sharp curve (having a small curvature radius) ahead, as illustrated in FIG. 11, its speed is high at the entrance of the gentle curve which is easy to pass, and low at the entrance of the sharp curve which is difficult to pass. If it is considered that the timing for starting the deceleration is advanced or delayed as in the first embodiment by the detection error of the actual position $P_0$, both the speed errors at the entrances of the gentle curve and the sharp curve are equal at $\Delta V$.

However, a transverse acceleration error $\Delta\alpha$, as caused by the speed error $\Delta V$ during passage of the curve, varies with the curvature radius R of the curve. In other words, the transverse acceleration error $\Delta\alpha$ is given by the speed error $\Delta V$ and the curvature radius R of the curve, as follows:

$$\Delta\alpha=\Delta V^2/R \qquad (9).$$

The speed error $\Delta V$ is constant for the gentle curve and the sharp curve, but the transverse acceleration error $\Delta\alpha$ is small for the gentle curve because of the large curvature radius R and large for the sharp curve because of the small curvature radius R. The characteristics described above are illustrated in FIG. 12.

Figure 13:
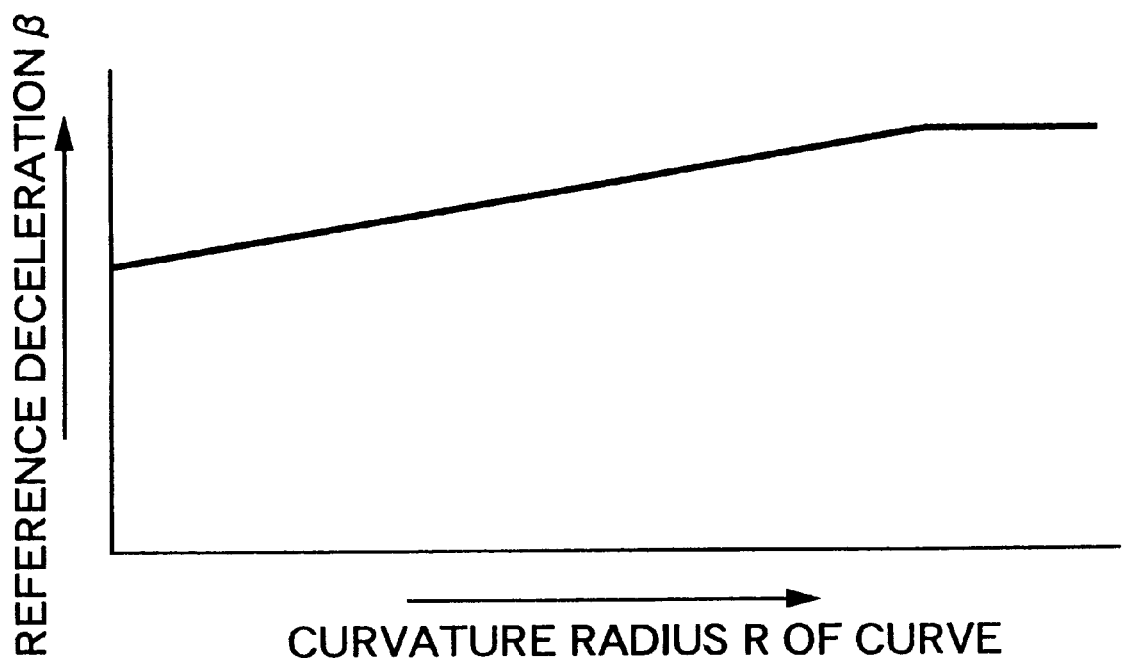
FIG. 13 is a diagram plotting a reference deceleration versus the curvature radius of a curve according to the second embodiment.

In order to compensate the dispersion of the transverse acceleration error $\Delta\alpha$ accompanying the detection error of the actual position $P_0$, therefore, the reference deceleration $\beta$ is corrected in the second embodiment according to the curvature radius R of the curve, as illustrated in FIG. 13. If the speed error $\Delta V$ is reduced in Formula (9) according to the reduction in the curvature radius R of the curve, the transverse acceleration error $\Delta\alpha$ can be held constant. For this, the reference deceleration $\beta$ may be increased according to the increase in the curvature radius R of the curve. This is because the line of the reference deceleration $\beta$ rises, if increased, in the direction of arrow A in FIG. 11 so that the speed error $\Delta V$ increases. If the reference deceleration $\beta$ is reduced, on the contrary, its line becomes gentle in the direction of arrow B so that the speed error $\Delta V$ decreases.

Thus, as illustrated in FIG. 13, if the correction is made to increase the reference deceleration $\beta$ in accordance with the increase in the curvature radius R of the curve, the transverse acceleration error $\Delta\alpha$ during the turning can be prevented from being dispersed according to the magnitude of the curvature radius R of the curve, so that the passableness of the curve can be decided with stable accuracy.

Figure 14:
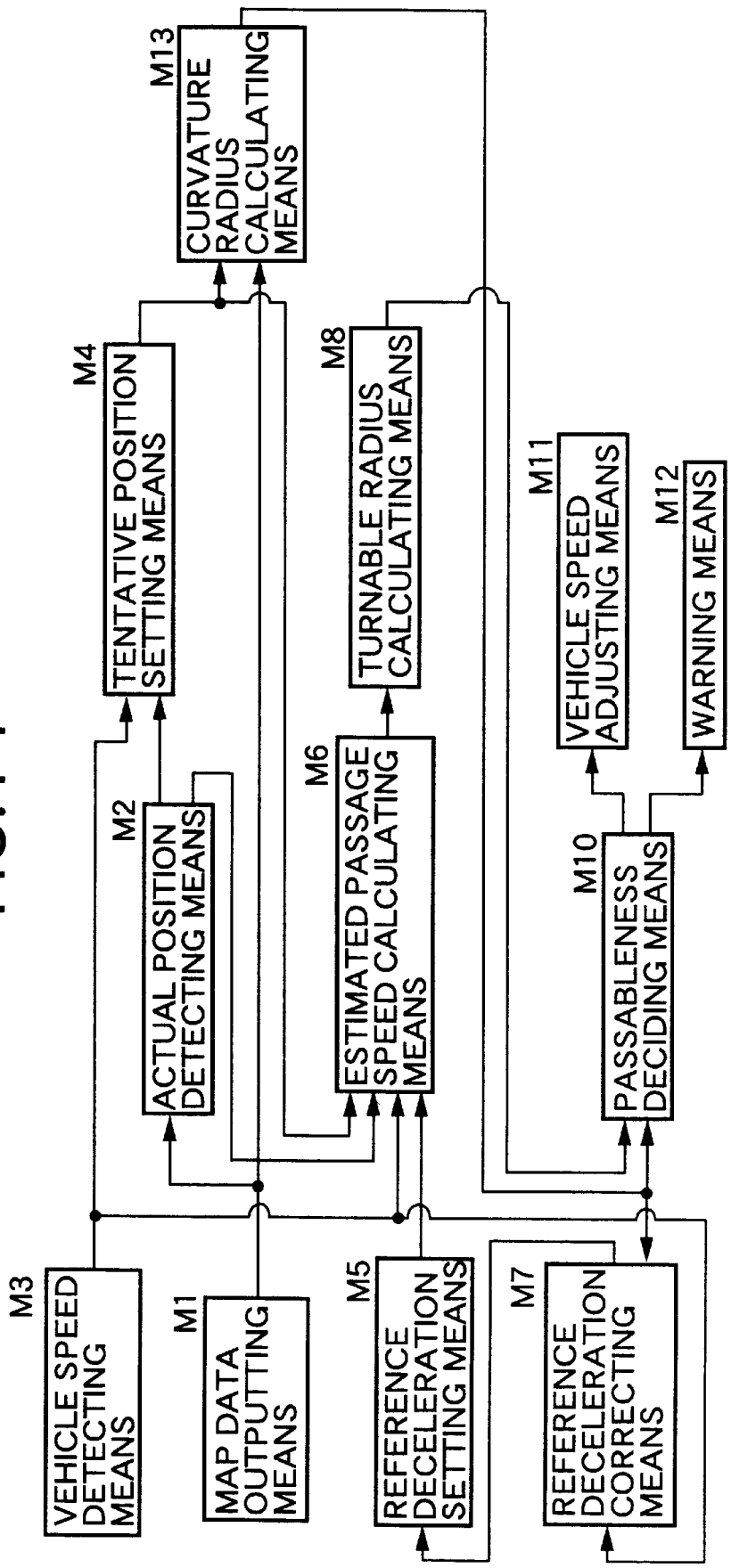
FIG. 14 is a diagram showing a third presently preferred embodiment of the invention and corresponds to the block diagram of FIG. 1.

A third preferred embodiment of the present invention will be described with reference to FIG. 14.

The vehicle control system of the third embodiment is provided with curvature radius calculating means M13 in place of the zone setting means M9 of the first embodiment. The curvature radius calculating means M13 calculates the radius of curvature R of a curve at each tentative position $N_k$ on the basis of the road data, as obtained from the map data outputting means M1, and the tentative position $N_k$, as obtained from the tentative position setting means M4. The passableness deciding means M10 decides the passableness of the curve by comparing the turnable radii $R_1$ and $R_2$ (as should be referred to Formulas (5) and (6)), as calculated by the turnable radius calculating means M8, and the curvature radius R of the curve.

Specifically, if the curvature radius R of the curve is not less than the larger turnable radius $R_1$, it is decided that the vehicle can safely pass the tentative position $N_k$. On the other hand, if the curvature radius R of the curve is less than the larger turnable radius $R_1$ but not less than the smaller turnable radius $R_2$, a warning is performed or given by the warning means M12. If the curvature radius R of the curve is less than the smaller turnable radius $R_2$, the vehicle speed is automatically adjusted by the vehicle speed adjusting means M11.

In this third embodiment, too, the reference deceleration correcting means M7 corrects the reference deceleration $\beta$ on the basis of the vehicle speed $V_0$, as detected by the vehicle speed detecting means M3, and/or the curvature radius R of the curve, as calculated by the curvature radius calculating means M13, so that the passableness of the curve can be decided with stable accuracy.

Figure 15:
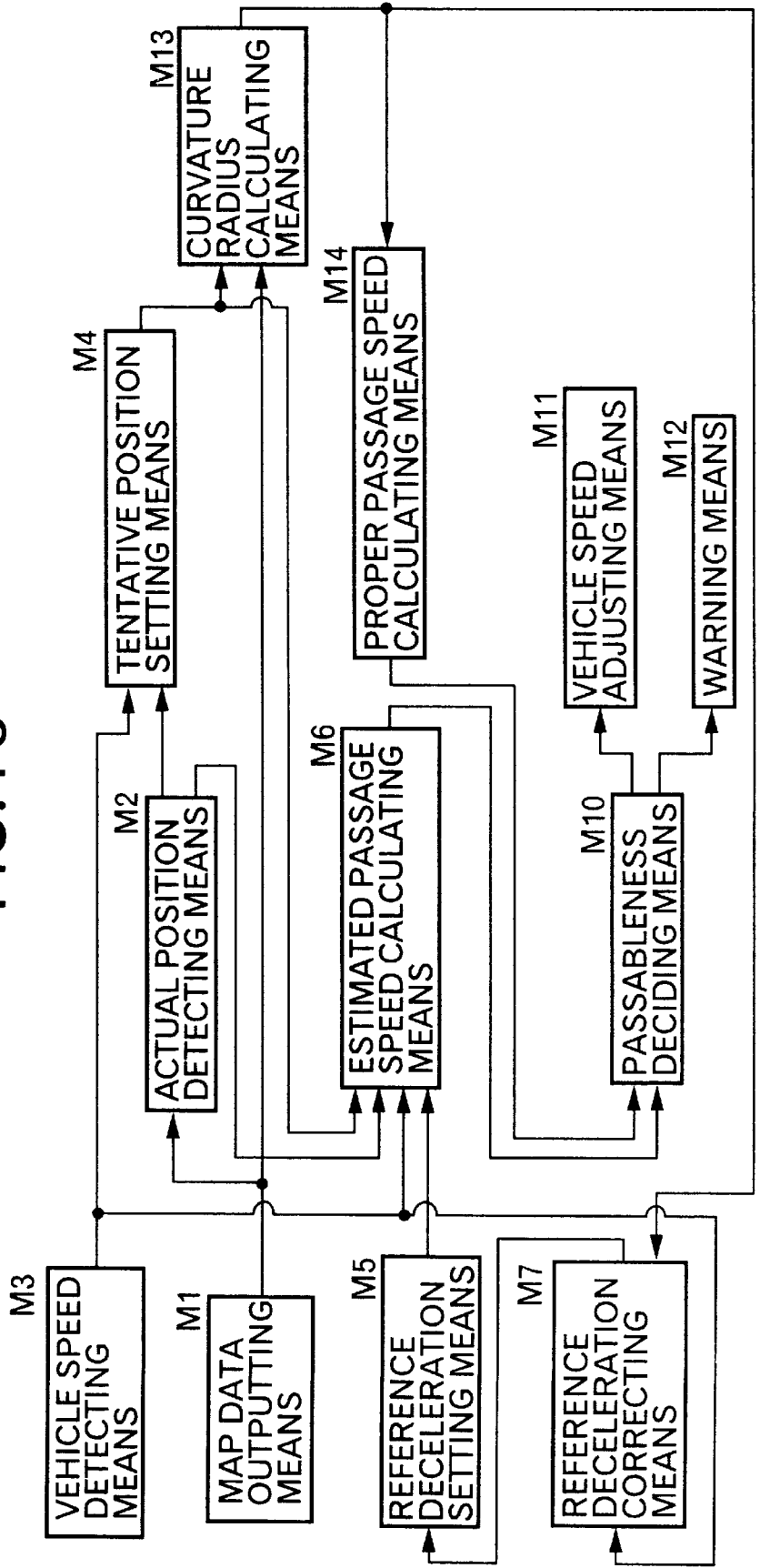
FIG. 15 is a diagram showing a fourth presently preferred embodiment of the invention and corresponds to the block diagram of FIG. 1.

A fourth preferred embodiment of the present invention will be described with reference to FIG. 15.

The vehicle control system of the fourth embodiment is provided with proper passage speed calculating means M14 in place of the turnable radius calculating means M8 of the third embodiment. The proper passage speed calculating means M14 calculates a first proper passage speed $V_1$ and a second proper passage speed $V_2$ from the following Formulas on the basis of the radius of curvature R of the curve, as obtained by the curvature radius calculating means M13, and the first and second reference transverse accelerations $\alpha_1$ and $\alpha_2$, as set in advance:

$$V_1=(\alpha_1 \times R)^{1/2} \qquad (10);$$

and $$V_2=(\alpha_2 \times R)^{1/2} \qquad (11).$$

The passableness deciding means M10 decides the passableness of the curve by comparing the estimated passage speed $V_k$ at each tentative position $N_k$ and the first and second proper passage speeds $V_1$ and $V_2$. Specifically, if the estimated passage speed $V_k$ is less than the smaller first proper passage speed $V_1$, it is decided that the vehicle can safely pass the tentative position $N_k$. On the other hand, if the estimated passage speed $V_k$ is not less than the smaller first proper passage speed $V_1$ but less than the larger second proper passage speed $V_2$, the warning is performed or given by the warning means M12. If the estimated passage speed $V_k$ is not less than the larger second proper passage speed $V_2$, the vehicle speed is automatically adjusted by the vehicle speed adjusting means M11.

In this fourth embodiment, too, the reference deceleration correcting means M7 corrects the reference deceleration $\beta$ on the basis of the vehicle speed $V_0$, as detected by the vehicle speed detecting means M3, and/or the curvature radius R of the curve, as calculated by the curvature radius calculating means M13, so that the passableness of the curve can be decided with stable accuracy.

Figure 16:
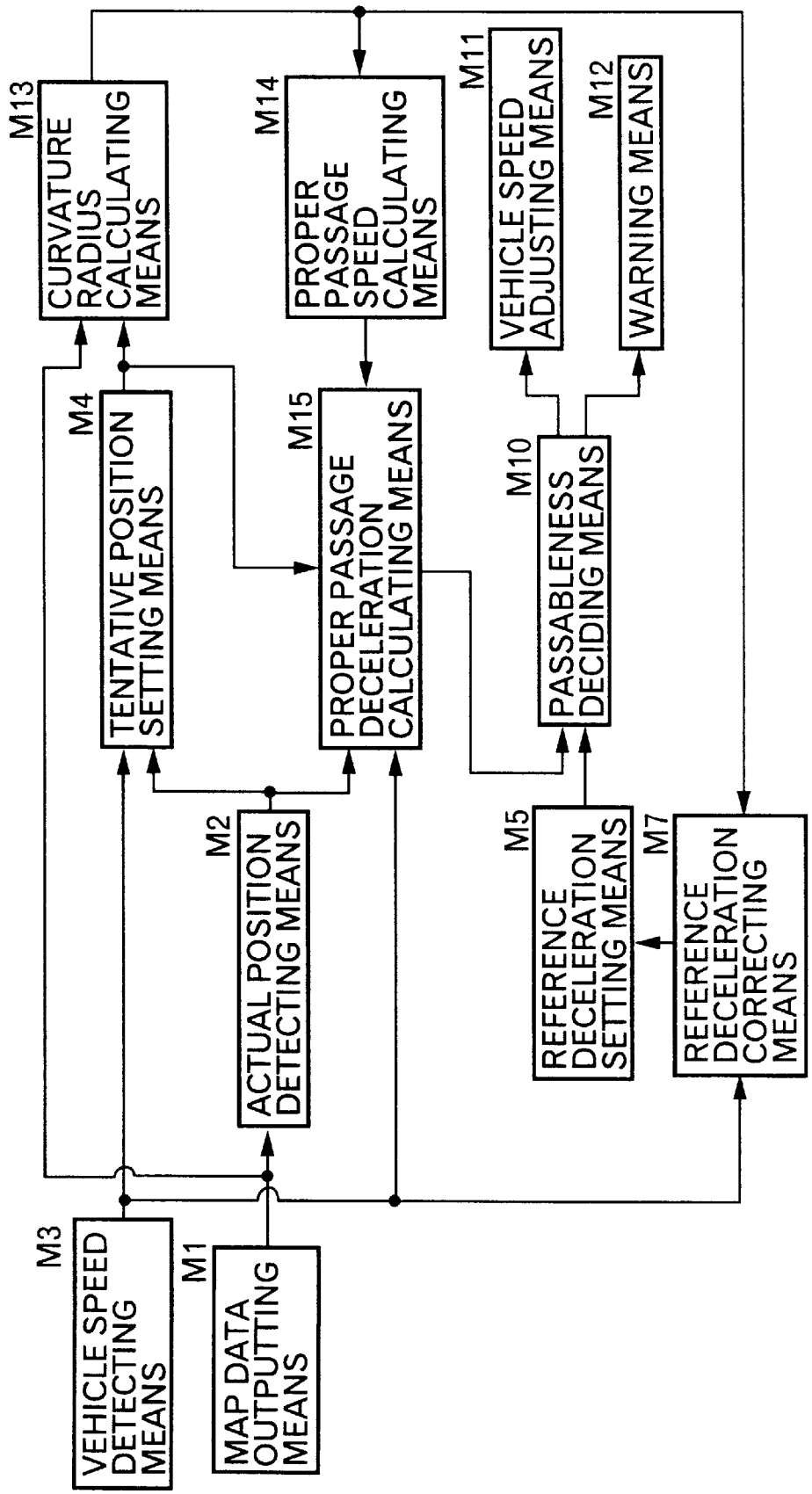
FIG. 16 is a diagram showing a fifth presently preferred embodiment of the invention and corresponds to the block diagram of FIG. 1.

A fifth preferred embodiment of the present invention will be described with reference to FIG. 16.

The reference deceleration setting means M5 of the vehicle control system of the fifth embodiment sets the reference deceleration $\beta$ depending upon whether the road surface is dry, wet or covered with snow, such that the reference deceleration $\beta$ is high for a large road surface friction coefficient and small for a small road surface friction coefficient. On the basis of the distance $S_k$ between the actual position $P_0$ and the tentative position $N_k$, the vehicle speed $V_0$ and the proper passage speeds $V_1$ and $V_2$ calculated by the proper passage speed calculating means M14, the proper passage deceleration calculating means M15 calculates the proper passage decelerations $\beta_1$ and $\beta_2$ necessary for a deceleration from the vehicle speed $V_0$ to the proper passage speeds $V_1$ and $V_2$ while the vehicle is running from the actual position $P_0$ to the tentative position $N_k$, as follows:

$$\beta_1=(V_0^2-V_1^2)/2S_k \qquad (12);$$

and $$\beta_2=(V_0^2-V_2^2)/2S_k \qquad (13).$$

For a large radius of curvature R of a curve, the proper passage speeds $V_1$ and $V_2$ become large so that the proper passage decelerations $\beta_1$ and $\beta_2$ become accordingly small. For a small radius of curvature R of a curve, the proper passage speeds $V_1$ and $V_2$ become small so that the proper passage decelerations $\beta_1$ and $\beta_2$ become accordingly large. The case in which the proper passage decelerations $\beta_1$ and $\beta_2$ are large corresponds to the case in which the curve is difficult to pass, because the curve cannot be safely passed without an abrupt deceleration.

The passableness deciding means M10 decides the passableness of the curve by comparing the proper passage decelerations $\beta_1$ and $\beta_2$ at each tentative position $N_k$ and the reference deceleration $\beta$. Specifically, if the reference deceleration $\beta$ is not less than the larger proper passage deceleration $\beta_2$, it is decided that the vehicle can safely pass the tentative position $N_k$. On the other hand, if the reference deceleration $\beta$ is less than the larger proper passage deceleration $\beta_2$ but not less than the smaller proper passage deceleration $\beta_1$, a warning is performed or given by the warning means M12. If the reference deceleration $\beta$ is less than the smaller proper passage deceleration $\beta_1$, the vehicle speed is automatically adjusted by the vehicle speed adjusting means M11.

In this fifth embodiment, too, the reference deceleration correcting means M7 corrects the reference deceleration $\beta$ on the basis of the vehicle speed $V_0$, as detected by the vehicle speed detecting means M3, and/or the curvature radius R of the curve, as calculated by the curvature radius calculating means M13, so that the passableness of the curve can be decided with stable accuracy.

According to the inventions as has been described hereinbefore, when it is decided on the basis of the actual vehicle position, as detected from the road data, and the reference deceleration whether or not the curve ahead can be safely passed, either the decision error, as caused by the detection error of the actual position, between the high and low vehicle speeds, or the decision error between the large and small curvatures of the road can be reduced by correcting the reference deceleration to decide the passableness more accurately.

Further, the reference deceleration may be corrected on the basis of the vehicle speed detected. As a result, even if the actual position is erroneously detected, it is possible to reduce the decision error of the passableness between the high and low vehicle speeds.

On the other hand, the reference deceleration may be corrected on the basis of the road data of a road ahead of the tentative position. As a result, even if the actual position is erroneously detected, it is possible to reduce the decision error of the passableness between the large and small curvatures of the road.

Further yet, the reference deceleration may be corrected on the basis of the radius of curvature of the road, as calculated by the curvature radius calculating means. As a result, even if the actual position is erroneously detected, it is possible to reduce the decision error of the passableness.

Still further, at least one of the warning to the driver and the automatic deceleration of the vehicle is performed by the vehicle control means. As a result, when the curve is difficult to pass, a proper countermeasure can be taken for safely passing the curve.

Although the present invention has been described in detail in connection with presently preferred embodiments thereof, it will be understood by persons skilled in the art that variations and modifications may be made thereto without departing from the gist, spirit or essence of the invention.

The scope of the invention is indicated by the appended claims, rather than by the foregoing detailed discussion of the presently preferred embodiments.

I claim:

1. A vehicle control system comprising:

map data outputting means for outputting map data as a set of a plurality of road data forming a road;

actual position detecting means for detecting an actual position of a subject vehicle on a map;

vehicle speed detecting means for detecting a vehicle speed;

tentative position setting means for setting a tentative position on the road ahead of the actual position;

reference deceleration setting means for setting a reference deceleration to decelerate the vehicle from the actual position thereof;

estimated passage speed calculating means for calculating an estimated passage speed at the tentative position on the basis of a distance from the actual position to the tentative position and the reference deceleration;

reference deceleration correcting means for correcting the reference deceleration;

turnable radius calculating means for calculating turnable radii at the tentative position on the basis of the estimated passage speed;

zone setting means for setting passableness deciding zones with reference to the tentative position on the basis of the turnable radii;

passableness deciding means for deciding a passableness of the vehicle through an upcoming section of road by overlapping the road data ahead of the tentative position and the passableness deciding zones; and vehicle control means for controlling the vehicle when it is decided that the vehicle cannot safely pass through the upcoming section of road.

2. A vehicle control system as set forth in claim 1, wherein said reference deceleration correcting means corrects the reference deceleration on the basis of the vehicle speed detected.

3. A vehicle control system as set forth in claim 1, wherein said reference deceleration correcting means corrects the reference deceleration on the basis of the road data of the road ahead of the tentative position.

4. A vehicle control system as set forth in claim 1, wherein said vehicle control means executes at least one of a warning to the driver and an automatic deceleration of the vehicle.

5. A vehicle control system according to claim 1, wherein said reference decelerating correcting means corrects said reference deceleration so as to reduce at least one of an error in the detected position of the vehicle and an error of the passableness between large and small curvatures of the road.

6. A vehicle control system comprising:

map data outputting means for outputting map data as a set of a plurality of road data forming a road;

actual position detecting means for detecting an actual position of a subject vehicle on a map;

vehicle speed detecting means for detecting a vehicle speed;

tentative position setting means for setting a tentative position on the road ahead of the actual position;

reference deceleration setting means for setting a reference deceleration to decelerate the vehicle from the actual position thereof;

estimated passage speed calculating means for calculating an estimated passage speed at the tentative position on the basis of a distance from the actual position to the tentative position and the reference deceleration;

reference deceleration correcting means for correcting the reference deceleration;

turnable radius calculating means for calculating turnable radii at the tentative position on the basis of the estimated passage speed;

curvature radius calculating means for calculating a radius of curvature of the road at the tentative position on the basis of the map data;

passableness deciding means for deciding a passableness of the vehicle through an upcoming section of road by comparing the radius of curvature and the turnable radii; and vehicle control means for controlling the vehicle when it is decided that the vehicle cannot safely pass through the upcoming section of road.

7. A vehicle control system as set forth in claim 6, wherein said reference deceleration correcting means corrects the reference deceleration on the basis of the radius of curvature of the road, as calculated by the curvature radius calculating means.

8. A vehicle control system as set forth in claim 6, wherein said reference deceleration correcting means corrects the reference deceleration based on at least one of the vehicle speed detected, the road data of the road ahead of tentative position, and the radius of curvature of the road as calculated by the curvature radius calculating means.

9. A vehicle control system as set forth in claim 6, wherein said vehicle control means executes at least one of a warning to the driver and an automatic deceleration of the vehicle.

10. A vehicle control system according to claim 6, wherein said reference decelerating correcting means corrects said reference deceleration so as to reduce at least one of an error in the detected position of the vehicle and an error of the passableness between large and small curvatures of the road.

11. A vehicle control system comprising:

map data outputting means for outputting map data as a set of a plurality of road data forming a road;

actual position detecting means for detecting an actual position of a subject vehicle on a map;

vehicle speed detecting means for detecting a vehicle speed;

tentative position setting means for setting a tentative position on the road ahead of the actual position;

reference deceleration setting means for setting a reference deceleration to decelerate the vehicle from the actual position thereof;

estimated passage speed calculating means for calculating an estimated passage speed at the tentative position on the basis of a distance from the actual position to the tentative position and the reference deceleration;

reference deceleration correcting means for correcting the reference deceleration;

proper passage speed calculating means for calculating proper passage speeds at the tentative position on the basis of the map data;

passableness deciding means for deciding a passableness of the vehicle through an upcoming section of road by comparing the proper passage speeds and the estimated passage speed; and vehicle control means for controlling the vehicle when it is decided that the vehicle cannot safely pass through the upcoming section of road.

12. A vehicle control system as set forth in claim 11, wherein said reference deceleration correcting means corrects the reference deceleration based on at least one of the vehicle speed detected and the road data of the road ahead of the tentative position.

13. A vehicle control system as set forth in claim 11, wherein said vehicle control means executes at least one of a warning to the driver and an automatic deceleration of the vehicle.

14. A vehicle control system according to claim 11, wherein said reference decelerating correcting means corrects said reference deceleration so as to reduce at least one of an error in the detected position of the vehicle and an error of the passableness between large and small curvatures of the road.

15. A vehicle control system comprising:

map data outputting means for outputting map data as a set of a plurality of road data forming a road;

actual position detecting means for detecting an actual position of a subject vehicle on a map;

vehicle speed detecting means for detecting a vehicle speed;

tentative position setting means for setting a tentative position on the road ahead of the actual position;

reference deceleration calculating means for calculating a reference deceleration on the basis of a road surface state;

reference deceleration correcting means for correcting the reference deceleration;

proper passage speed calculating means for calculating proper passage speeds at the tentative position on the basis of the map data;

proper passage deceleration setting means for setting proper passage decelerations necessary for safely passing the tentative position at the proper passage speeds on a basis of the distance from the actual position to the tentative position, the vehicle speed and the proper passage speeds;

passableness deciding means for deciding a passableness of the vehicle through an upcoming section of road by comparing the proper passage decelerations and the reference deceleration; and vehicle control means for controlling the vehicle when it is decided that the vehicle cannot safely pass through the upcoming section of road.

16. A vehicle control system as set forth in claim 15, wherein said reference deceleration correcting means corrects the reference deceleration based on at least one of the vehicle speed detected and the road data of the road ahead of the tentative position.

17. A vehicle control system as set forth in claim 15, wherein said vehicle control means executes at least one of a warning to the driver and an automatic deceleration of the vehicle.

18. A vehicle control system according to claim 4, wherein said reference decelerating correcting means corrects said reference deceleration so as to reduce at least one of an error in the detected position of the vehicle and an error of the passableness between large and small curvatures of the road.

* * * * *

UNITED STATES PATENT AND TRADEMARK OFFICE
CERTIFICATE OF CORRECTION

PATENT NO : 5,978,724
DATED : 11-9-99
INVENTOR(S): Hiroshi Sekine

It is certified that error appears in the above-identified patent and that said Letters Patent is hereby corrected as shown below:

Column 1, line 15, after "out" insert --of--.

Column 2, line 45, change "eight" to --eighth--.

Column 4, line 48, change "$\alpha^2$" to --$\alpha_2$--.

Column 5, line numbered between 30 and 31, change "$X_0$)" to --$Y_0$)--;
line numbered between 34 and 35, change "$P_0(X_0,X_0)$" to --$P_0(X_0,Y_0)$--;
line 57, change "Node" to --node--.

Column 7, line 64, change "to" to --$t_0$--.

Column 13, line numbered between 24 and 25 (claim 8, line 4), before "tentative" insert --the--.

Column 14, line 59 (claim 18, line 1), change "claim 4" to --claim 15--.

Signed and Sealed this

Twenty-second Day of August, 2000

Q. TODD DICKINSON

*Attest:*

*Attesting Officer*      *Director of Patents and Trademarks*